United States Patent [19]
Hamilton et al.

[11] 3,720,519
[45] March 13, 1973

[54] FLAVOR POTENTIATOR COMPRISING DRIED, YEAST FERMENTED WHEY AND METHOD OF USE

[75] Inventors: Robert M. Hamilton; Salvatore F. Ziccarelli, both of Downers Grove, Ill.

[73] Assignee: Beatrice Foods Co., Chicago, Ill.

[22] Filed: Feb. 16, 1971

[21] Appl. No.: 115,752

[52] U.S. Cl.....................99/140 N, 99/57, 99/90
[51] Int. Cl. .................................................A23l 1/26
[58] Field of Search ...........99/140 R, 140 N, 57, 90; 195/28 N

[56] References Cited

UNITED STATES PATENTS

| | | |
|---|---|---|
| 3,466,174 | 9/1969 | Bundus et al..............................99/90 |
| 3,466,176 | 9/1969 | Bundus et al............................99/140 |
| 3,466,177 | 9/1969 | Bundus et al............................99/140 |
| 3,485,641 | 12/1969 | Bundus et al............................99/140 |

OTHER PUBLICATIONS

Hall et al., "Drying Milk & Milk Products," AVI Pub. Co., Inc. (1966) pp. 171-174.

*Primary Examiner*—Morris D. Wolk
*Assistant Examiner*—Warren Bovee
*Attorney*—Cushman, Darby & Cushman

[57] ABSTRACT

Flavor potentiators for use in foods and food products. The potentiators are dried yeast fermented whey of low moisture content and the potentiators are mixed with food at levels up to 10 percent by weight. After the potentiators are mixed with foods the potentiators are, preferably, in a hydrated state.

15 Claims, No Drawings

FLAVOR POTENTIATOR COMPRISING DRIED, YEAST FERMENTED WHEY AND METHOD OF USE

This invention relates to flavor potentiation of foods and food products as well as foods and food products containing flavor potentiators. More particularly the invention relates to flavor potentiators which are derived from microbiological modifications of whey and whey-like substances.

As is known in the art, flavor is a sensation realized when a food or beverage is placed into the oral cavity. It is primarily dependent upon the reactions of taste and olfactory receptors to food chemical stimulus. Generally, taste substances taken into the mouth are dissolved in the aqueous layers which normally cover the surface of the tongue. This allows the chemical substances to be rapidly brought to the excitatory portions of the receptors, by the combination action of diffusion, convection and hydrostatic forces. Flavor discrimination depends on the differential excitation of the receptors, and the resulting pattern of activity is transmitted to the central nervous system by the olfactory and taste systems.

Most foods, however, are not of a homogeneous mixture when eaten, and the release of the various flavor components during eating results in a pattern of activity giving rise to the flavor particular to the food. During this release, the mixing of the components also may initiate enzymatic reactions which lead to new chemical stimuli of the taste and olfactory systems. Hence, taste results from excitation of the taste and olfactor systems by various chemicals released during mastication of food.

It is well known that various treatments of food can alter the chemicals released or the effect thereof on the olfactory and taste systems, and, hence, alter the resulting taste of the food. A most common treatment is, of course, simply cooking food. Similarly, serving food either warm, cold or hot, alters either the chemicals which are released or the effect on the olfactory and taste systems and produce different degrees and distinctness of flavor. Further, the use of condiments in food can alter the resulting flavor. For example, various proteins have been extensively used in cooking to alter the flavor of the resulting cooked food. While it is not understood what chemical mechanism takes place in altering the resulting flavor of foods having condiments therein, it is known that these condiments do effect the sensory receptors of the taste and olfactory systems, as well as control the release of various chemicals from the food during mastication.

The art has long been concerned with means and materials for affecting the taste of food. For example, in China and Japan, soy sauce, which is derived from fermented soybeans, is added to many foods and is a common condiment. Soy sauce contains monosodium glutamate and interest therein eventually led to the production of relatively pure monosodium glutamate, which is now widely used as a material for altering the flavor of food. Materials which affect the flavor of foods are referred to as flavor intensifiers or flavor potentiators. Most authorities agree that monosodium glutamate has very little, if any, flavor itself but that it intensifies the flavor of meats and vegetables through a rounding or blending effect. Apparently, the chemical action is that of more desirably controlling the flavor chemicals in the foods. Accordingly, monosodium glutamate has been mainly used only in certain foods.

Under the circumstances, while monosodium glutamate has become an important item of commerce as a flavor potentiator, and it is effective on some foods, particularly meats and vegetables, it has relatively little effect on many other foods, and the same is essentially true for other known potentiators such as the nucleotides (5'-nucleotides, 5'-inosinate and 5'guanylate) and hydrolyzed vegetable proteins. Additionally, monosodium glutamate, as well as the nucleotides and hydrolyzed vegetable proteins (HVP), are relatively expensive, especially when considered in the levels commonly used. Of course, it would be desirable to provide flavor potentiators with a broader range of application and which are less expensive than the potentiators now available.

Accordingly, it is an object of this invention to provide a flavor potentiator which allows wide use in flavor potentiation of many foods and which is derived from inexpensive sources.

It is a further object to provide foods having the flavor potentiator therein, which foods have a more desirable flavor and taste for the consuming person.

Other objects will be apparent from the following disclosure and claims.

Briefly stated, it has now been discovered that a very effective flavor potentiation is accomplished by a specific form of microbiologically altered whey. Whey is a by-product of cheese manufacture, after separation of the curds therefrom, and at present finds relatively little commercial use. As a matter of fact, whey generally constitutes a problem of disposal. The present potentiators are derived by growing a culture of yeast on whey and then providing a specific form of the growth product.

The product resulting from growing a culture of yeast on whey is known to the art and is generally referred to as yeast fermented whey. Yeast fermented whey is pro-duced commercially by Beatrice Foods Co., and the product and process are described in U.S. Pat. Nos. 3,485,641; 3,466,174; 3,466,176; and 3,466,177, which disclosures are incorporated herein be reference. The yeast fermented whey disclosed in the above-identified references is described as a synthetic bread flavor. The yeast fermented whey, briefly, is produced by growing a yeast, e.g. *Saccharomyces cerevisiae*, on a cheese whey, with or without an additional nitrogen source, while intimately mixing the whey and yeast with large quantities of air. The resulting growth product may be used directly to provide a bread flavor for artificially leavened bread (chemically leavened bread). The growth product has a strong bread flavor and when incorporated into an artificially leavened bread produces a bread flavor in the artificially leavened bread. Alternately, the growth product may be used in combination with conventional baking yeast to impart additional bread flavor to the bread product. If desired, the product may be concentrated by removal of a part of the liquid associated with the growth product or the growth product may be dried either with or without first concentrating the growth product.

The present inventors, however, discovered that when the growth product is dried to a low moisture content there is a pronounced loss of bread flavor and the low moisture content dried product exhibits relatively little if any bread flavor whatsoever. Apparently, drying the growth product to low moisture contents produces some yet unknown change in the growth product which change produces a resulting product of an essentially different nature.

While this change is not understood, nevertheless, when the growth product described in the aforenoted patents is dried to a low moisture content, it functions, not as a bread flavor, but it functions most effectively as a flavor potentiator.

While numerous analytical procedures have been performed in attempting to characterize the flavor potentiators of the present invention, these procedures have not been able to identify the flavor potentiators with any reasonable degree of specificity. Accordingly, for the purposes of the present specification, the terms "dried yeast fermented whey" mean the product resulting from the process of the aforenoted patents, which product has been dried to a low moisture content, hence apparently changing the nature of the product, and that terminology will be used hereinafter in the specification and claims as defined.

Accordingly, the breadth of the process described in the aforementioned patents is equally applicable to the present invention and the breadth of that process is incorporated herein by reference.

Generally speaking, however, the whey employed may be the whey obtained from the manufacture of any cheese and the particular whey is not critical. For example, there may be used cottage cheese whey, cheddar cheese whey, Swiss cheese whey, Neufchatel cheese whey, cream cheese whey or any other cheese whey. Cottage cheese whey, however, is most easy to use and is the preferred whey.

The yeast fermented whey disclosed in said patents is produced by fermentation and assimilation processes of the yeast on the whey. Instead of a single yeast, a mixture of yeasts or a yeast or yeasts with nontoxic bacteria of the coccus family can be used. For example, enterococcus of serological group D and Streptococci of group N and Lactobacilli are suitable. The enterococcus alone, however, will not produce the yeast fermented whey.

As disclosed in said patents, any of the known yeasts may be used in the process, for example, Saccharomyces, such as *Saccharomyces cerevisiae* (bakers' yeast) or *delbrickii*, or any yeast that can be grown on lactic acid or lactose.

Irrespective of the particular yeast being used, the process generally is that of inoculating pasteurized whey with the yeast and mixing with large quantities of air to insure aerobic conditions. The air is mixed into the system in any conventional fashion, e.g., with a high speed impeller or air may be bubbled through the culture throughout the growth period. Preferably, growth is continued for at least 5 hours up to 60 hours, but more preferably between 14 to 18 hours at 60° to 95°F., particularly at 70° to 86°F., although shorter or longer times can be employed at lower or higher temperatures. In any case, the rate of growth of the organisms will drop rapidly at the end of the natural growth period and little further growth will take place thereafter. Of course, the growth period should be long enough to obtain an economical concentration of growth product in the whey medium. Usually by the end of the growth period about 5 percent of the volume of the product is yeast.

The product can then be directly dried to a low moisture content or it may be concentrated before drying. If the product contains over 50 percent water by weight it has been found desirable to concentrate it to 50 percent or less by volume, e.g., 30 or 40 percent to improve drying efficiency. This concentration may be carried out at 112° to 130°F. in a vacuum. Alternatively, the product may be cooled to 110°F., seeded with lactose in an amount of 0.05 percent by weight and cooled to 70°F. or lower to force crystallization.

The drying step can be accomplished as desired and conventional drying techniques are quite acceptable. For example, a vacuum drier, roller drier, oven drier or spray drier may be used. It is preferred that a spray drier be used, since the dried product is then in a powder form which is a convenient form for the application thereof to foods.

In any event, the drying step must reduce the moisture content to a low level. While the moisture level is not narrowly critical, the moisture level should be at or below 5 percent by weight of the dried product and preferably at or below 3 percent, e.g., 2 percent or 1 to 0.5 percent. It is necessary that such low moisture contents be accomplished during the drying step, since as noted above some change occurs during drying to a low moisture content which change converts the growth product from a bread flavor to a flavor potentiator with essentially no flavor, itself, at all.

The drying temperatures are not critical so long as the product is dried to the required low moisture contents. For example, when the growth product is spray dried, inlet temperatures as high as 350°F., may be used. Of course lower temperature may be used all the way down to approximately room temperature, but these lower temperatures unduly prolong the drying step.

The production of the present potentiators will be illustrated below by way of a specific example. However, as noted above, the process for producing the growth product is disclosed in detail in the aforenoted patents and those patents are referenced herein.

EXAMPLE 1

Into a 3,000 gallon tank was placed 1,000 gallons of cottage cheese whey which had previously been concentrated to 12 percent by weight of solids. The whey was pasteurized, i.e., heated to 185°F. for 20 minutes, and then cooled to 79°F. The cooled whey was inoculated with 1 percent by volume of the whey with an inoculum having $10^7$ yeast cells per cc of *Saccharomyces delbrickii*. The yeast and whey mixtures were aerated by stirring and bubbling air therethrough at a rate of 30 to 40 cfm. Growth of the yeast was carried out for about 20 hours at 79°F. and until a steady pH of about 5.6–6.3 was reached. The growth product was pasteurized, i.e., at 185°F. for 20 minutes, and the product was concentrated to 45 percent solids by weight in a vacuum pan.

The concentrated product was spray dried in a conventional manner at 350°F. inlet and 150°F. outlet to form a powder having a moisture content of 2 percent by weight of the dried product.

The remarkable activity of the present potentiators are illustrated by the removal of the bitter flavors of brewed coffee. As a further remarkable illustration, spices such as pepper and clove, tend to mask weaker food flavors, but when the potentiators are also present, the action of the spices is retarded sufficiently that the weaker food flavors can be fully sensed.

To illustrate the above, in a laboratory model system, two samples of equal amounts of oil-soluble and water-soluble flavors, blended with an equal weight of water, were tasted by a panel of 12 tasters. The first sample contained 0.5 percent of the dried yeast fermented whey while the second sample contained no dried yeast fermented whey. All 12 of the panel members picked the sample having the dried yeast fermented whey therein as a sample having two flavors, while the members picked the sample without the dried yeast fermented whey as having only one flavor — they could taste the oil-soluble flavor but could not taste the water-soluble flavor in the sample without the dried yeast fermented whey.

The dried yeast fermented whey has an entirely different effect as compared with conventional flavor potentiators such as monosodium glutamate and nucleotides. This completely different effect not only allows a much wider use of the dried yeast fermented whey, but allows its independent effect even in the presence of other known potentiators such as monosodium glutamate, conventional nucleotides and HVP. Hence, the dried yeast fermented whey can be effectively used in combination with these known potentiators.

For many applications, the combination of the dried yeast fermented whey and known potentiators, e.g., monosodium glutamate, conventional nucleotides and HVP increases the effect of each, and a significant economic advantage is thus provided by these combinations. Further, such combinations are not restricted to foods with which the known potentiators have been previously used. Under these circumstances, for some applications, the combinations of the dried yeast fermented whey with known potentiators such as monosodium glutamate, nucleotides and HVP, are preferred embodiments of the invention. The proportions of the dried yeast fermented whey to known potentiators is not narrowly critical and can be selected from a very wide range. For example, the proportions of dried yeast fermented whey to monosodium glutamate can be from as high as 100 to 1 to as low as 1 to 100, although proportions more nearly balanced are preferred, e.g., 10 to 1 to 1 to 10. Normally, the proportion of dried yeast fermented whey to nucleotides will be between 100 to 1 to as low as 50 to 1, while the proportions of HVP will be similar to monosodium glutamate.

It should be noted that the yeast fermented whey of the present invention, should be used in a hydrated form, i.e., the dried yeast fermented whey must be placed in the presence of water. If the dried yeast fermented whey is not placed in a hydrated form, the flavor potentiation thereof is decreased, and in most applications is decreased to the point of significant loss of effectiveness. While many foods contain more than sufficient water to hydrate the dried yeast fermented whey, other foods will not contain sufficient water to accomplish this hydration. In that case, the dried yeast fermented whey should be applied in a water medium to the food or water should be added to the mixture. In any case, the end result should be that the water naturally contained in the food and the water added by way of medium or to the mixture should be sufficient that the dried yeast fermented whey becomes at least partially hydrated. Complete hydration is not necessary to obtain at least some of the advantage of the present invention, but the full advantage of the present invention is only obtained when hydration is complete. Hence, if the dried yeast fermented whey is applied to a relatively dry food and the natural water associated therewith is only sufficient to hydrate, for example, one-half of the dried yeast fermented whey, then the effectiveness thereof will be less than that of the fully hydrated material. In order to achieve the full effects of the present invention, therefore, it should be insured that enough moisture is present in the food to effect hydration, if the dried yeast fermented whey is added to the food in an unhydrated condition, e.g., not in a water medium. To effect full hydration, the total water content of the mixture of food and dried yeast fermented whey should be at least equal in weight to the amount of the dried yeast fermented whey added thereto. This amount of water will sufficiently hydrate the dried yeast fermented whey and provide the full effectiveness of the invention. Greater amounts of water can be used as desired, and it should be understood that the water referred to above is water which is available to hydrate the dried yeast fermented whey and does not refer to water so tied up in the food that it is not available for hydration.

While the amount of the present potentiators used with foods can vary widely on a weight basis, generally, best results are obtained with concentrations of at least 0.01 percent and up to concentrations as high as 10 percent, based on the weight of the food. However, the percentages on a like weight bases are preferably between 0.05 and 5 percent, and especially between 0.05 and up to 3 percent, e.g., 2 percent, although it should be understood that percentages outside of these ranges may be used if desired.

The following examples will illustrate the effectiveness of the present potentiators. However, the invention is not limited to the specific examples which follow, but is fully applicable to the foregoing disclosure. The examples only serve to illustrate the invention and provide best modes thereof.

EXAMPLE 2

Dried yeast fermented whey (moisture content about 2 percent by weight) was mixed and blended with cream cheese in the amount of 5 percent by weight, based on the cream cheese. Samples of the resulting cream cheese were given to a panel of 28 tasters, along with samples of plain cream cheese. The panel did not know which samples contained the potentiators or the number of samples, if any, which contained the potentiators. The panel was asked to select the samples which had better flavor and to note comments, if any, for their selection. 81.5 percent of the panel picked the samples with the potentiators therein and the reasons generally noted for that selection was the smoother flavor. The 18.5 percent of the panel who selected the plain cream cheese made their selection on the basis of the sharper flavor thereof. This example illustrates the surprising utility of the present potentiators in dairy products.

EXAMPLE 3

A commercially available coffee was brewed with the recommended amount of coffee and samples thereof were whitened with a commercially available coffee whitener. In one-half of the samples, dried yeast fermented whey (moisture content about 2 percent by weight) was added to the whitened coffee in an amount of 1, 2 and 10 percent, based on the amount of coffee whitener added to the coffee. These samples were submitted to a panel of tasters with instructions to pick the samples which had better flavor. 58 percent preferred the samples with the potentiators at a 10 percent level, 10.1 percent preferred the samples with the potentiators at a 1 percent level, 10.1 percent could not tell the difference, and 21 percent preferred the coffee without the potentiators therein. The 68 percent (total) which preferred the coffee with the potentiators therein selected those samples on the basis of a more creamy flavor. The 21 percent who preferred the samples without the potentiators, selected those samples on the basis of the presence of strong and bitter flavors, to which they were accustomed in drinking coffee. While this example illustrates the ability of the present potentiators to effectively potentiate flavors in nondairy products such as commercial coffee whiteners, the example also illustrates that the resulting flavor may not be acceptable to some consumers, because those consumers are accustomed to particular flavors and miss those flavors if they are altered by the present potentiators.

EXAMPLE 4

In a similar procedure to Example 3, commercially available coffee was brewed and prepared for samples to be submitted to a panel of 34 tasters. An identical brewing procedure was carried out except that for each 90 grams of dry coffee to be brewed, 10 grams of dried yeast fermented whey (moisture content about 2 percent by weight) was added thereto. These samples were submitted to the panel with instructions to pick the coffees which had the best flavors. 79 percent of the panel picked the coffee brewed with the potentiators on the basis of a less bitter and more smooth taste. 20 percent of the panel picked the coffee without the potentiators on the basis of the normal acid and bitter taste, to which they had become accustomed. Similar tests were made at 2.5 percent and 10 percent levels of the potentiators and the results were almost identical to the results reported above.

EXAMPLE 5

In a similar test to that of Example 3, instant coffee was brewed in the manner recommended on the label of the instant coffee jar. To a portion of the samples of instant coffee, 10 percent by weight of dried yeast fermented whey (moisture content about 1.5 percent) was added thereto and to another portion of the samples, 1 percent by weight of the dried yeast fermented whey, was added thereto. The remaining samples had no potentiator therein. 95 percent of all the panelists picked the samples containing potentiators on the basis that it was less bitter. Of this 95 percent, 58 percent preferred the samples with the 10 percent level of potentiators and 10.5 percent preferred the samples with the 1 percent level of potentiators.

The following examples will illustrate the use of the present potentiators in combination with monosodium glutamate (designated M.S.G. therein).

EXAMPLE 6

Commercially available canned chicken noodle soup was prepared with the prescribed amount of water and 1.5 percent of weight of salt, with 2.0 percent by weight of M.S.G. The same soup was prepared with 1.5 percent by weight of salt, 1.0 percent of M.S.G. and 0.5 percent of dried yeast fermented whey (moisture content 2 percent by weight). The samples of the soup were submitted to a panel of tasters, with instructions to indicate the soups they preferred in terms of flavor. 40 percent of the panel preferred the soup containing the potentiators and 60 percent of the panel liked all samples equally well. This example illustrates that for many consumers, the addition of a small amount of the present potentiators improves the flavor they experienced and for other tasters, an equally good flavor is obtained when the monosodium glutamate content is decreased by ½ and replaced by only a corresponding ¼ of the present potentiators. This constitutes a significant economical advantage with the use of the present potentiators.

EXAMPLE 7

The procedure of Example 6 was repeated except that the chicken noodle soup was replaced in the same proportions with a commercially available canned chicken broth. The results of the taste panel were: 85 percent liked equally well both the broth with 2 percent of M.S.G. and the broth with 1 percent M.S.G. and 0.5 percent of the present potentiators. 5 percent of the panel preferred the broth with 2 percent M.S.G. Here again, this example illustrates the economical advantage of replacing at least part of the M.S.G. with the present potentiators.

EXAMPLE 8

A commercially available canned beef consume was prepared according to the directions. To the consume was added 1.5 percent by weight of M.S.G. and 1.5 percent by weight of salt. A second sample of the consume was prepared with 0.75 percent of M.S.G. 0.5 percent of salt and 0.375 percent of dried yeast fermented whey (moisture content about 2 percent by weight). The results of the taste panel was that 85 percent preferred the samples with the present potentiator therein and 15 percent preferred the samples with the M.S.G. alone at the 1.5 percent level.

EXAMPLE 9

A commercially available beef vegetable soup was prepared in a manner similar to Example 8 with 1.5 percent of M.S.G., 1.5 percent of salt. A second set of samples were prepared with 0.75 percent of M.S.G., 1.5 percent of salt and 0.375 percent of dried yeast fermented whey (moisture content about 2 percent by weight). 88 percent of the panel preferred the soup with the present potentiator therein and 12 percent of the panel preferred the soup with only the M.S.G. at 1.5 percent level.

From the above, it can be easily seen that the present potentiators constitute a very significant advance in the art of flavor potentiation. The invention provides not only a significant increase in flavor potentiation, of a nature not heretofore known to the art, but also provides a distinct economic advantage over the use of conventional flavor potentiators such as monosodium glutamate and nucleotides. The potentiators further provide an improved effect in combination with conventional flavor potentiators such as monosodium glutamate and nucleotides.

The dried yeast fermented whey may be used with virtually any edible food material, including nuts, vegetables, tubers, leguminous crops, fruits, meats, dairy products, animal and vegetable fats, fish and shellfish, beverages confectioneries and cereals. Accordingly, the term "food" as used herein is intended to include any edible food material for human consumption or animal consumption.

EXAMPLE 10

To show the effectiveness of the present potentiators with confectioneries, a series of ice cream topping jams and flavors were tested. All of the topping jams and flavors are commercial products manufactured by the Cincinnati Fruit Company, with the exception of the chocolate syrup which is manufactured by the Hershey Chocolate Company. In each test, one sample contained one-half percent by weight of the present potentiators and another sample did not contain any of the present potentiators. The results are shown in the table below:

| Topping | % of Panel preferring sample with potentiator | Reasons of Panel for Preference |
| --- | --- | --- |
| Strawberry | 60% | More distinct fruit flavor |
| Black Raspberry | 72% | More distinct fruit flavor |
| Cherry | 86% | More distinct fruit flavor |
| Chocolate Syrup | 80% | Full chocolate flavor |
| Butterscotch Syrup | 57% | More pronounced flavor |

EXAMPLE 11

A conventional dip was prepared by mixing on an equal volume basis Lipton's Onion Soup Mix with sour cream. The mixture was divided and to one portion was added 5 percent of the present potentiators. The panel of tasters clearly preferred the sample containing the present potentiators and noted that that sample had a more distinct onion flavor than the sample without the present potentiators.

EXAMPLE 12

A canned cream celery soup manufactured by the Campbell Soup Company was prepared according to the directions and the soup was divided. To one portion of the soup one-half percent by weight of the present potentiators was added and the samples were submitted to a panel of tasters for evaluation. 90 percent of the panel preferred the sample with the present potentiators therein and noted that the preference was based on a richer or more creamy flavor as well as a stronger celery flavor.

What is claimed is:

1. A mixture comprising a food and a flavor potentiation amount of from 0.01 to 10 percent by weight of dried yeast fermented whey wherein the dried yeast fermented whey has been previously dried to a moisture content of less than 5 percent by weight.

2. A mixture according to claim 1 also having present a flavor potentiating amount of monosodium glutamate or nucleotides.

3. A mixture according to claim 1 having from 0.05 to 5 percent of said dried yeast fermented whey therein.

4. A mixture according to claim 1 wherein after admixture with the food the yeast fermented whey is at least partially hydrated.

5. A mixture according to claim 1 wherein the yeast fermented whey is in an at least partially hydrated form when mixed with the food.

6. A mixture according to claim 1 wherein the initial moisture content is less than 3 percent by weight.

7. A flavor potentiator comprising dried yeast fermented whey having a moisture content of less than 5 percent by weight.

8. A flavor potentiator according to claim 7 which also contains a flavor potentiating amount of monosodium glutamate or nucleotides.

9. A flavor potentiator according to claim 7 wherein the moisture content is less than 3 percent by weight.

10. A flavor potentiator according to claim 8 wherein the dried yeast fermented whey is provided in an at least partially hydrated form either prior to or after addition to food.

11. A method of potentiating the flavor of food comprising mixing with the food a flavor potentiating amount of from 0.01 to 10 percent by weight of dried yeast fermented whey wherein the dried yeast fermented whey has been previously dried to a moisture content of less than 5 percent by weight.

12. The method of claim 11 wherein the amount is up to 5 percent.

13. The method of claim 11 wherein the moisture content is less than 3 percent by weight.

14. The method of claim 11 wherein the dried yeast fermented whey is at least partially hydrated either prior to or after mixing with the food.

15. The method of claim 11 wherein a flavor potentiating amount of monosodium glutamate or nucleotides is added to the mixture.

* * * * *